United States Patent
Zarins (10) Patent No.: US 12,313,109 B2
(45) Date of Patent: May 27, 2025

(54) END NUT ASSEMBLY

(71) Applicant: Applied System Technologies, Inc., Charlotte, NC (US)

(72) Inventor: Roman Todd Zarins, Denver, NC (US)

(73) Assignee: Applied System Technologies, Inc., Charlotte, NC (US)

( * ) Notice: Subject to any disclaimer, the term of this patent is extended or adjusted under 35 U.S.C. 154(b) by 225 days.

(21) Appl. No.: 17/870,772

(22) Filed: Jul. 21, 2022

(65) Prior Publication Data

US 2024/0026918 A1  Jan. 25, 2024

(51) Int. Cl.
| | |
|---|---|
| *F16B 37/08* | (2006.01) |
| *F16L 19/065* | (2006.01) |
| *F16L 37/091* | (2006.01) |

(52) U.S. Cl.
CPC ............ *F16B 37/08* (2013.01); *F16L 19/065* (2013.01); *F16L 37/091* (2013.01); *F16L 2201/60* (2013.01)

(58) Field of Classification Search
CPC ..... F16L 19/065; F16L 2201/60; F16L 19/06; F16L 19/061; F16L 19/08; F16L 19/086; F16L 37/091; F16B 37/08
See application file for complete search history.

(56) References Cited

U.S. PATENT DOCUMENTS

| | | | |
|---|---|---|---|
| 1,444,727 A | 2/1923 | Burdin | |
| 2,146,336 A | 2/1939 | Frey | |
| 3,284,109 A | 11/1966 | Parker | |
| 3,291,510 A * | 12/1966 | Kody | F16L 19/086 |
| 3,312,484 A * | 4/1967 | Davenport | F16L 37/091 |
| 3,355,193 A | 11/1967 | Craig | |
| 3,362,730 A | 1/1968 | St Clair | |
| 3,429,596 A * | 2/1969 | Charles | F16L 19/086 |
| 3,471,176 A | 10/1969 | Gilchrist | |
| 3,489,441 A | 1/1970 | William | |
| 3,524,466 A | 8/1970 | Scoy | |
| 3,622,184 A | 11/1971 | Deasy et al. | |
| 3,694,009 A | 9/1972 | Phillips | |
| 3,986,240 A | 10/1976 | Skinner | |
| 3,999,785 A | 12/1976 | Blakeley | |

(Continued)

FOREIGN PATENT DOCUMENTS

| | | | | |
|---|---|---|---|---|
| EP | 550323 A1 * | 7/1993 | | F16L 37/091 |
| KR | 20080000611 U * | 4/2008 | | |

(Continued)

OTHER PUBLICATIONS

KR 20080000611U—Machine Translation—English (Year: 2008).*
EP-550323-A1—Machine Translation—English (Year: 1993).*
KR-2008074033-A—Machine Translation—English (Year: 2008).*

*Primary Examiner* — William S. Choi
(74) *Attorney, Agent, or Firm* — Seth L. Hudson; Maynard Nexsen PC (57) ABSTRACT

An end nut assembly comprising a nut body defining a first portion and a second portion, a first opening is adjacent the first portion and a second opening is adjacent the second portion, and an axial bore extends between the first opening and the second opening. A bite ring defines an outer ring and a plurality of teeth extends radially inwardly from the outer ring, and a spacer defines an inner surface and an outer surface, wherein the inner surface defines a cavity centrally located within the spacer. The end nut assembly does not contain an o-ring.

14 Claims, 11 Drawing Sheets

(56) References Cited

U.S. PATENT DOCUMENTS

| | | |
|---|---|---|
| 4,073,513 A | 2/1978 | Blakeley |
| 4,158,461 A | 6/1979 | Francis |
| 4,258,941 A | 3/1981 | Sands |
| 4,372,586 A | 2/1983 | Rosenberg |
| 4,613,171 A | 9/1986 | Corcoran |
| 4,790,058 A | 12/1988 | Miller |
| 5,000,489 A | 3/1991 | Burke |
| D334,050 S | 3/1993 | Foxlee |
| 5,577,776 A | 11/1996 | Welch |
| 5,971,001 A | 10/1999 | Andersson |
| 6,301,917 B1 | 10/2001 | Lacoste |
| 6,412,824 B2 | 7/2002 | Kunsman |
| 7,552,742 B2 | 6/2009 | Dole |
| 7,644,955 B1 | 1/2010 | Komolrochanapom |
| 7,731,240 B2 | 6/2010 | Barker |
| 7,926,855 B2 | 4/2011 | Kitagawa |
| 7,980,599 B2 | 7/2011 | Schindel |
| 8,746,752 B2 | 6/2014 | Hayashi |
| 8,789,853 B2 | 7/2014 | Gershkovich et al. |
| 8,870,235 B2 | 10/2014 | Turk |
| 9,228,681 B2 | 1/2016 | Kluss |
| 9,334,995 B2 | 5/2016 | Kremer et al. |
| 9,574,691 B1 | 2/2017 | Crompton et al. |
| 9,810,359 B2 * | 11/2017 | Spears .................. F16L 37/091 |
| 9,920,866 B2 | 3/2018 | Crompton et al. |
| 9,989,175 B2 | 6/2018 | McAllister |
| 10,047,884 B2 | 8/2018 | Taylor |
| 10,309,568 B2 | 6/2019 | Borawski |
| 10,794,785 B2 | 10/2020 | Hayes et al. |
| 2004/0163970 A1 | 9/2004 | Chelchowski et al. |
| 2005/0097763 A1 * | 5/2005 | Williams ............ F16L 19/065 |
| 2005/0134038 A1 | 6/2005 | Walsh |
| 2008/0011358 A1 | 1/2008 | Brandt et al. |
| 2008/0106092 A1 | 5/2008 | Klein et al. |
| 2008/0111376 A1 | 5/2008 | Ferrero |
| 2008/0203723 A1 | 8/2008 | Cellemme |
| 2008/0309067 A1 | 12/2008 | Fazakerly |
| 2009/0194990 A1 * | 8/2009 | Williams ................ F16L 19/08 |
| 2009/0208271 A1 | 8/2009 | Krohn |
| 2009/0267345 A1 | 10/2009 | Choi |
| 2010/0230957 A1 | 9/2010 | Tsuda |
| 2010/0314863 A1 | 12/2010 | Ohara et al. |
| 2012/0306118 A1 | 12/2012 | Hayashi et al. |
| 2012/0326439 A1 * | 12/2012 | Bogert |
| 2013/0181446 A1 | 7/2013 | Le Clinche |
| 2014/0238506 A1 | 8/2014 | Adams et al. |
| 2015/0300549 A1 | 10/2015 | Cheng-Sheng et al. |
| 2015/0323112 A1 | 11/2015 | Wright |
| 2016/0040816 A1 | 2/2016 | Cheng-Sheng et al. |
| 2016/0348490 A1 | 12/2016 | Holm et al. |
| 2016/0358517 A1 | 12/2016 | Pate et al. |
| 2017/0205010 A1 | 7/2017 | Pai |
| 2017/0356573 A1 * | 12/2017 | Graves ................. F16L 19/065 |
| 2018/0202588 A1 * | 7/2018 | Kim ...................... F16L 19/065 |
| 2018/0283767 A1 | 10/2018 | Conley |
| 2019/0032823 A1 | 1/2019 | McNamara et al. |
| 2019/0390801 A1 | 12/2019 | Puckett et al. |
| 2020/0263818 A1 | 8/2020 | Prince |
| 2020/0273377 A1 | 8/2020 | Tanghetti |
| 2020/0370687 A1 | 11/2020 | Taylor |
| 2022/0088660 A1 | 3/2022 | Wang |

FOREIGN PATENT DOCUMENTS

| | | |
|---|---|---|
| KR | 2008074033 A * | 8/2008 |
| WO | 2005024283 A1 | 3/2005 |
| WO | 2005052425 A2 | 6/2005 |
| WO | 2005078332 A1 | 8/2005 |
| WO | 2006087749 A1 | 8/2006 |
| WO | 2008097053 A1 | 8/2008 |
| WO | 2010047573 A1 | 4/2010 |
| WO | 2010080027 A1 | 7/2010 |
| WO | 2013056273 A2 | 4/2013 |
| WO | 2016016490 A1 | 2/2016 |
| WO | 2016036841 A1 | 3/2016 |
| WO | 2016064118 A1 | 4/2016 |
| WO | 2016206812 A1 | 12/2016 |
| WO | 2017003023 A1 | 1/2017 |
| WO | 2017004671 A1 | 1/2017 |
| WO | 2018225915 A1 | 12/2018 |
| WO | 2019182192 A1 | 9/2019 |
| WO | 2020036637 A1 | 2/2020 |

\* cited by examiner

END NUT ASSEMBLY

FIELD OF THE INVENTION

The present invention relates generally to an end nut assembly, and more generally relates to an end nut assembly that is quick to connect to a coupling and does not utilize an o-ring

BACKGROUND OF THE INVENTION

A compressed air piping system generally consists of a compressor and piping to carry the compressed air to its desired destination. The piping that carries the compressed air may be placed in a building, such as a plant, stadium, arena, manufacturing facility, hospital, or the like. The piping is not a single piece of pipe laid in a straight line. Instead, the piping is composed of various shapes and sizes of pipe for carrying or transporting the compressed air. Each pipe serves a particular function in carrying the compressed air. Segments of pipes need to be joined together or coupled.

In joining segments of pipe, the coupling couples an end of each pipe segment together without affecting the functionality of the piping. The coupling may assist in not only joining two segments of pipe together, but may also assist in changing the direction of the pipe, allowing the piping to bend along a hallway, corridor, or the like. The coupling may also contain an additional inlet or outlet for allowing a measuring instrument to be inserted into the compressed air flow for measuring a particular parameter of the flow, such as flow rate, pressure, temperature and the like. The additional outlet portion may allow the compressed air to be redirected. Likewise, the additional inlet portion may be utilized to introduce another stream of compressed air into the flow of the piping or to introduce an element or item into the stream of compressed air flowing through the piping, such as an additional gas or other component (ions, odor control, etc.).

A fitting can be utilized to expedite the connection between piping and the coupling quickly and efficiently. There is a need for a fitting, that is a quick-to-connect fitting, that can easily and readily engage a pipe segment to a coupling in an effective and efficient manner. The present invention discloses an end nut assembly that is a quick-to-connect fitting that does not utilize an o-ring.

BRIEF SUMMARY OF THE INVENTION

According to an embodiment of the present invention, an end nut assembly comprising a nut body defining a first portion and a second portion, a first opening is adjacent the first portion and a second opening is adjacent the second portion, and an axial bore extends between the first opening and the second opening. A bite ring defines an outer ring and a plurality of teeth extends radially inwardly from the outer ring, and a spacer defines an inner surface and an outer surface, wherein the inner surface defines a cavity centrally located within the spacer. The end nut assembly does not contain an o-ring.

According to another embodiment of the present invention, the nut body of the end nut assembly is composed of Aluminum.

According to yet another embodiment of the present invention, the nut body of the end nut assembly contains internal threads adjacent the second opening.

According to yet another embodiment of the present invention, the nut body contains a shoulder disposed within the axial bore and an internal grove disposed within the axial bore and adjacent the shoulder.

According to yet another embodiment of the present invention, the spacer is positioned within the axial bore and contains a circular cross-section and at least one finger is disposed on the outer surface for engaging the nut body.

According to yet another embodiment of the present invention, the spacer contains a tapered section on the inner surface.

According to yet another embodiment of the present invention, the spacer contains two tapered sections on opposed sides of the inner surface.

According to yet another embodiment of the present invention, the identification ring contains an indicia marking portion, wherein the identification ring is received on a receiving surface on the second portion of the end nut assembly.

According to yet another embodiment of the present invention, the teeth of the bite ring contain two side portions extending radially inwardly from an inner surface of the bite ring and a void is positioned between each tooth along the inner surface of the bite ring.

According to yet another embodiment of the present invention, the spacer is positioned within the axial bore and contains two or more resiliently, flexible fingers disposed on the outer surface for engaging the nut body.

According to yet another embodiment of the present invention, the nut assembly includes a nut body defining a first portion and a second portion, a first opening is adjacent the first portion and a second opening is adjacent the second portion, an axial bore extends between the first opening and the second opening and internal threads are disposed adjacent the second opening. A bite ring defining an outer ring and a plurality of teeth extending radially inwardly from the outer ring, and a spacer defining an inner surface and an outer surface, wherein the inner surface defines a cavity centrally located within the spacer.

According to yet another embodiment of the present invention, a method of connecting an end nut assembly to a pipe segment that includes providing an end nut assembly including a nut body defining a first portion and a second portion, a first opening is adjacent the first portion and a second opening is adjacent the second portion, an axial bore extends between the first opening and the second opening and internal threads are disposed adjacent the second opening. A bite ring defines an outer ring and a plurality of teeth extending radially inwardly from the outer ring, and a spacer defines an inner surface and an outer surface, wherein the inner surface defines a cavity centrally located within the spacer. The second portion of the nut body engages a coupling. A pipe segment is inserted into the first opening of the nut body and into the axial bore until an end of the pipe segment is within an opening in the coupling.

BRIEF DESCRIPTION OF THE DRAWINGS

The present invention is illustrated and described herein with reference to the various drawings, in which like reference numbers denote like method steps and/or system components, respectively, and in which.

DETAILED DESCRIPTION OF THE INVENTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Referring now specifically to the drawings, an end nut assembly is illustrated in FIGS. 1-5 and is shown generally at reference numeral 10. The end nut assembly 10 is comprised of a nut body 12, a bite ring 14, a spacer 16, and an optional identification ring 18. The nut body 10 defines an axial bore 20 extending between a first portion and a second portion. A first opening 22 is adjacent the first portion and a second opening 24 is adjacent the second portion, wherein the axial bore 20 extends therebetween. The nut body 10 contains a conical inner surface forming the bounds of the axial bore 20 with an internally threaded portion with internal threads 26. The axial bore 20 proceeds a predetermined distance from the first opening 22 in the first portion and has a constant diameter with a smooth inner surface that is conical and without any rough portions, grooves, threads, or protrusions.

Figure 4:
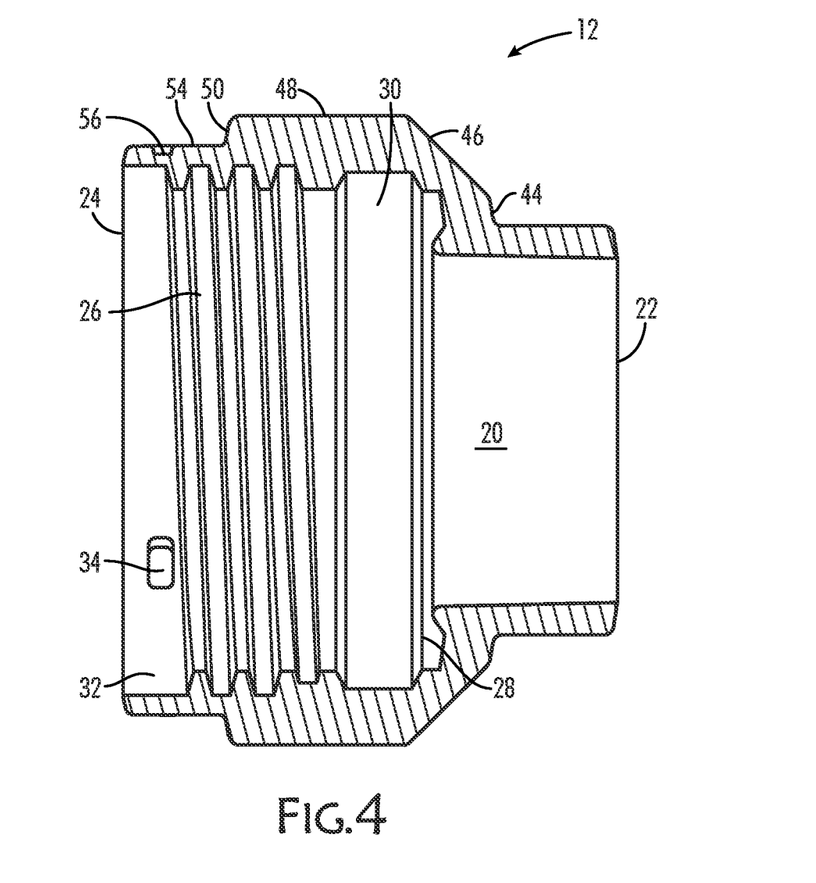
FIG. 4 is a cut-away view of the nut body.

A shoulder 28, as illustrated in FIG. 4, is disposed within the axial bore 20 and positioned at a predetermined distance from the first opening 22 in the first portion, containing a constant diameter. The shoulder 28 is configured to receive the bite ring 14 and an internal groove 30 is disposed adjacent the shoulder 28 for receiving the spacer 16. The internal groove 30 may have an inside diameter greater than the inside diameter of the first opening 22. The internally threaded portion containing internal threads 26 is located adjacent the internal groove 30 and a second opening surface 32 is disposed adjacent the threaded portion and adjacent the second opening 24 in the second portion.

The second opening surface 32 is located on the second portion of the nut body 12 and adjacent the second opening 24. The second opening surface 32 partially forms the inner surface of the nut body 12 and contains a smooth surface that is conical and without any rough portions, grooves, threads, or protrusions. At least one second portion opening 34 is disposed on the second portion of the nut body 12. The second portion opening 34 extends from the exterior surface of the nut body 12 to the inner surface of the nut body 12.

Figure 1:
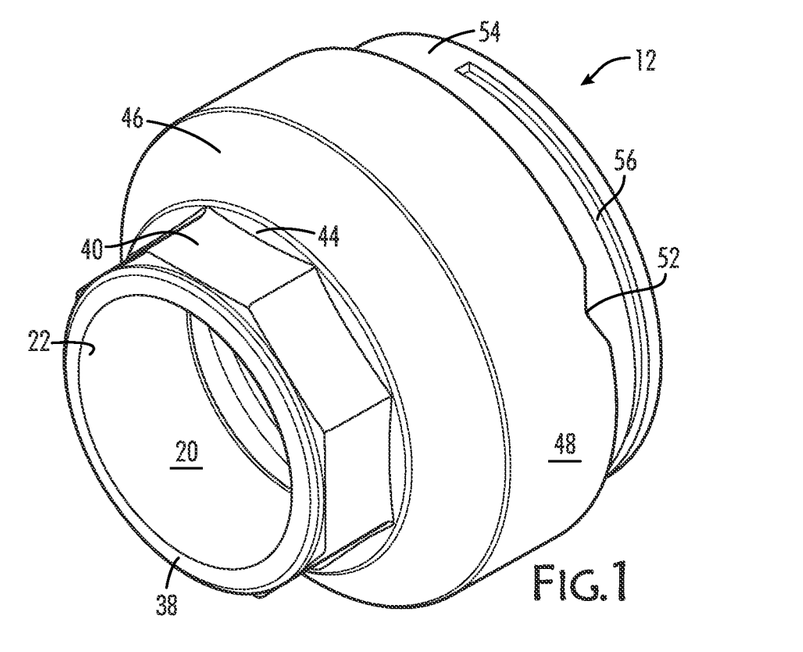
FIG. 1 is a front perspective view of the nut body.
Figure 2:
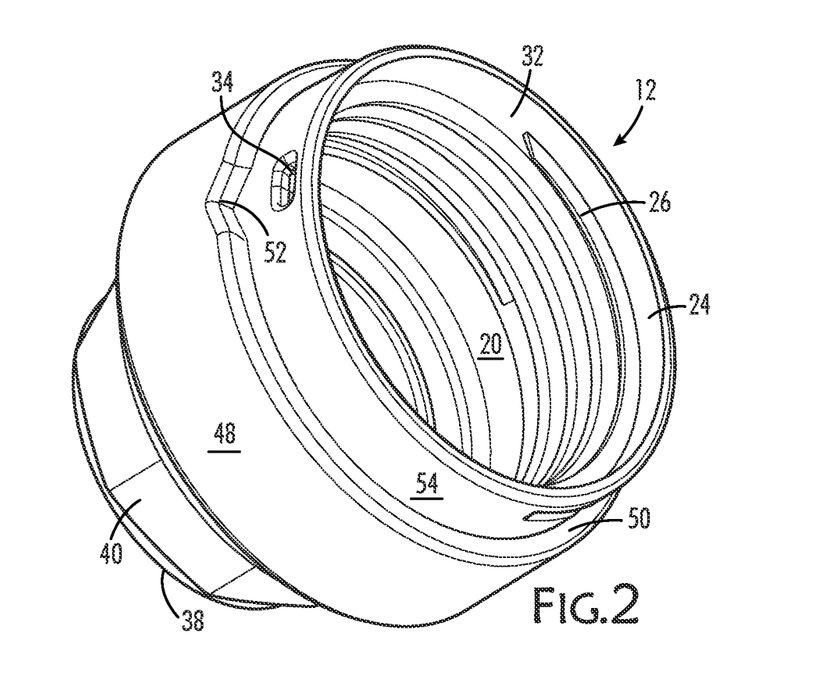
FIG. 2 is a back perspective view of the nut body.
Figure 3:
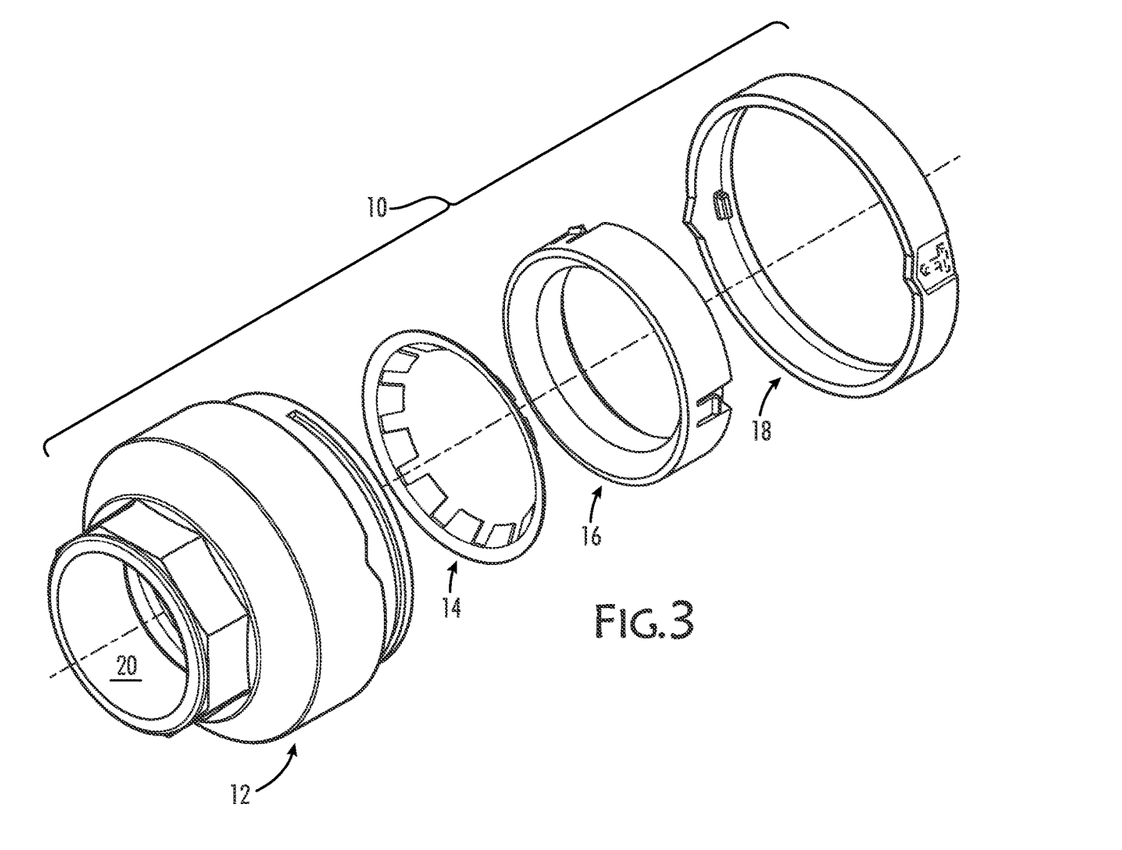
FIG. 3 is an exploded view of the end nut assembly.

The first portion of the nut body 12 contains a circumferential lip 38 adjacent the first opening 22. A geometrically shaped outer portion, which is an octagonally shaped outer portion, as illustrated in the figures, is disposed adjacent the circumferential lip 38 containing a plurality of wrench flats 40. The wrench flats 40 are disposed about the outer periphery of the nut body 12 on the first portion, as shown in FIGS. 1-3. The wrench flats 40 are intended to receive a wrench or other similar tool for rotating the nut body 12. The nut body 12 may be attached to a coupling, such as a ported coupling 42 as illustrated in FIGS. 15-18, or other device. The wrench or similar tool may engage the wrench flats 40 for rotating the nut body 12 for engagement to the ported coupling 42 or for disengaging or removing the nut body 12 from the ported coupling 42. The internal threads 26 of the nut body 12 threadedly connect to a coupling or other device. As shown in FIGS. 15-18 the internal threads 26 threadedly connect to exterior threads of the ported coupling 42. The nut body 12 may be threaded onto and unthreaded from the ported coupling 42.

A first shelf 44 is disposed adjacent the octagonally shaped outer portion, as shown in FIGS. 1 and 4. The first shelf 44 circumscribes the outer portion nut body 12. A chamfered portion 46 axially extends from the first shelf 44 to an outer ring surface 48 that is the outermost surface of the end nut assembly 10 and circumscribes the end nut assembly 10. The outer ring surface 48 extends from the chamfered portion 46 to an outer edge. The outer edge is adjacent a second shelf 50. The second shelf 50 circumscribes the end nut assembly 10 and contains at least one indent 52. The indent 52 consists of a first portion and a second portion, wherein the portion of the second shelf 50 between the first portion and the second portion extends within the outer ring surface 48 towards each other and meeting at a substantially midway point between the first portion and the second portion within the outer ring surface 48. The second shelf 50 may contain two or more indents 52 or a plurality of indents 52 spaced along the second shelf 50. A receiving surface is disposed adjacent the second shelf 50 and adjacent the second portion of the end nut assembly 10. As described above, at least second portion opening 34 is disposed within the receiving surface 54 extending from the exterior surface to the inner surface of the nut body 12. As illustrated, a second portion opening 34 may be disposed adjacent an indent 52 on the second shelf 50. The receiving surface 54 may contain two or more second portion openings 34 or a plurality of second portion openings 34.

A channel 56, as shown in FIG. 1, is disposed on the receiving surface 54. The channel 56 is preferably disposed in close proximity to the outer edge of the second portion of the nut body 12 adjacent the second opening 24. The channel 56 partially circumscribes the receiving surface 54 and does not fully circumscribe the receiving surface 54 or extend along the entire receiving surface 54. The channel 56 preferably has the same width between a first end and a second end of the channel 56, along with a constant channel depth.

Figure 18:
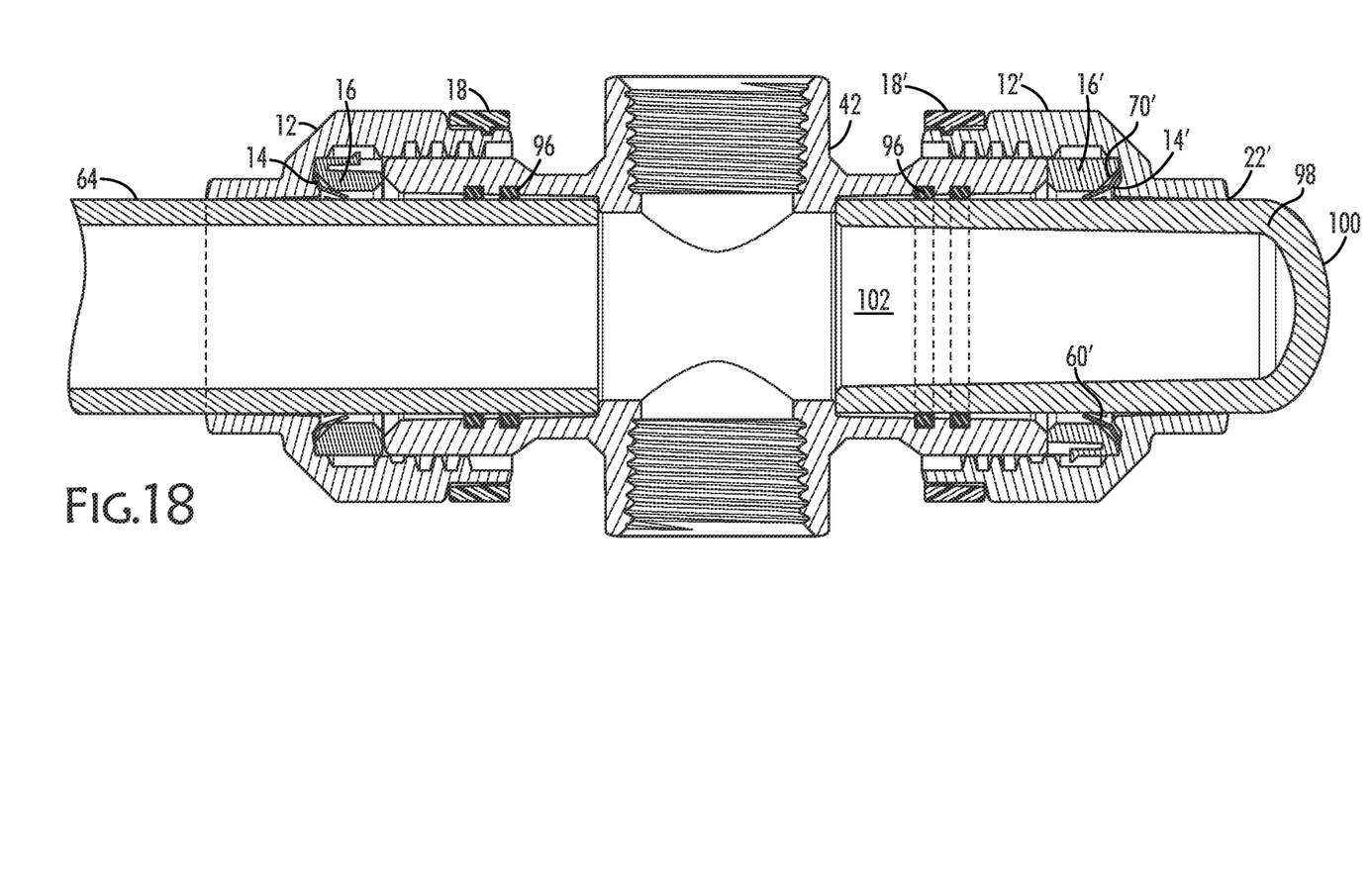
FIG. 18 is a cut-away view of end nut assemblies engaged to a ported coupling.

The bite ring 14, as illustrated in FIGS. 6, 7, 8A, and 8B can interface with the ported coupling 42 or other device to which the nut body 12 is engaged. The bite ring 14 contains an outer ring 58 and a plurality of teeth 60 extending radially inwardly from the outer ring 58. The teeth 60 contain two side portions extending radially inwardly from the inner surface of the outer ring 58, wherein the two side portions are disposed on either side of each tooth 60 and extend radially inwardly towards an outer edge. A void 62 is positioned between each tooth 60 along the inner surface of the outer ring 58. As illustrated, the teeth 60 are spaced an equal distance apart along the inner surface of the outer ring 58 and a void 62 is disposed between each tooth 60 along the inner surface of the outer ring 58. The teeth 60 may be flexible and/or bendable, and preferably at least bendable along the intersection with the inner surface of the outer ring 58. The teeth 60 may also be flexible and/or bendable in addition to being bendable along the intersection with the inner surface of the outer ring 58. The bite ring 14 is positionable within the axial bore 20 and can be seated on the shoulder 28, as shown in FIG. 18. The outer surface of the outer ring 58 is seated on the shoulder with the plurality of teeth 60 extending radially inwardly to the axial bore 20. The teeth 60 are designed to restrict translation of the portion of the pipe segment 64 relative to the axial bore 20 when the pipe segment 64 is moved within the axial bore 20.

Figure 12:
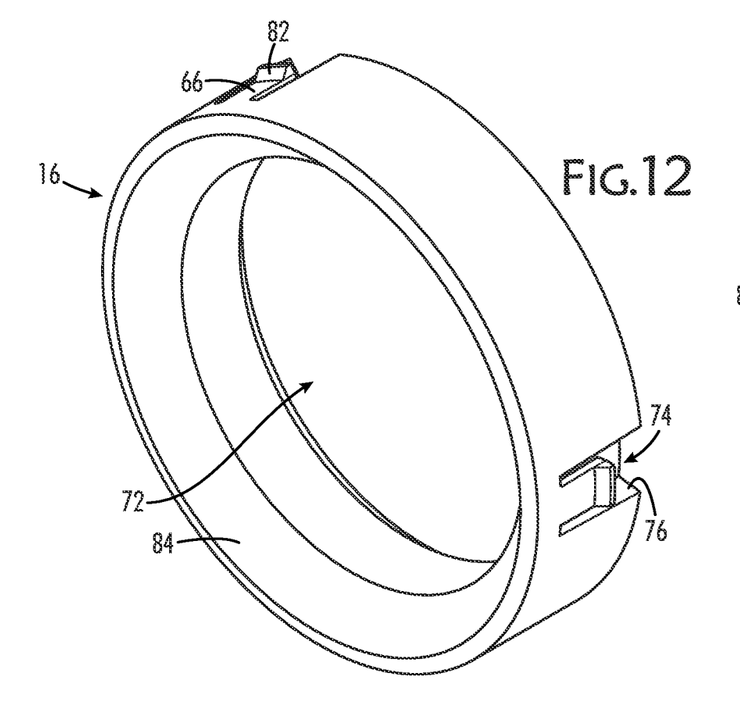
FIG. 12 is a perspective view of the spacer.
Figure 13:
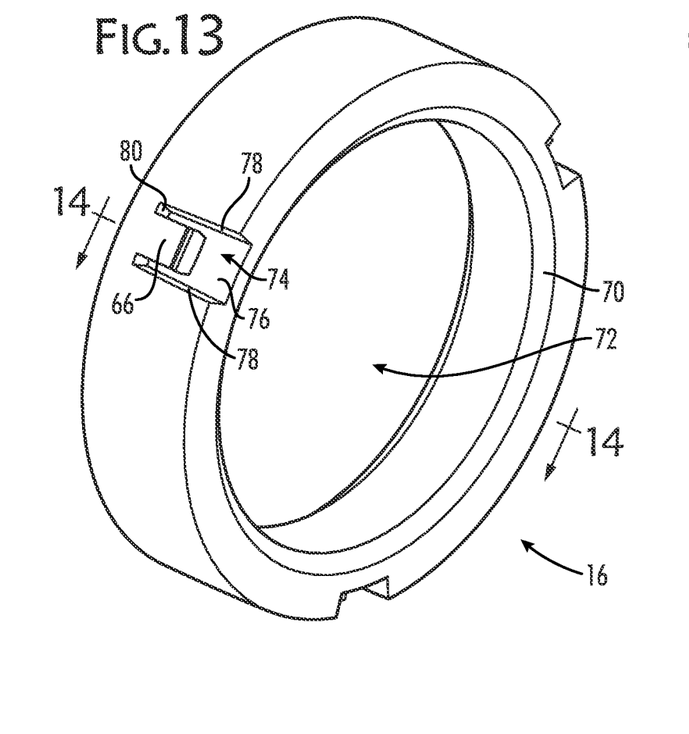
FIG. 13 is a perspective view of the spacer.
Figure 14:
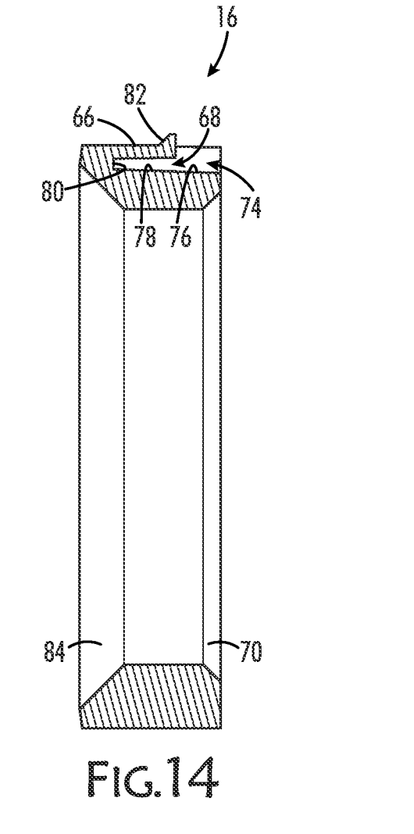
FIG. 14 is a cut-away view of the spacer.

The spacer 16 is illustrated in FIGS. 12, 13, and 14. The spacer 16 is positioned within the axial bore 20 and received within the internal groove 30, as shown in FIG. 18. The spacer 16 contains a circular cross-section with an inner surface and an outer surface, wherein the inner surface defines a cavity 72 centrally located within the spacer 16. The spacer 16 contains an inner edge and an outer edge that form the openings for the cavity 72 and disposed on opposite sides of the spacer 16, extending from the inner surface to the outer surface. The transition between the outer edge and the inner surface is tapered and contains a tapered section 70, as shown in FIGS. 13 and 14. At least one finger 66 is disposed on the outer surface of the spacer 16. The finger 66 is preferably resiliently flexible containing a first end and a second end. The finger is contained or at least partially contained within a slot 74 disposed within the exterior surface of the spacer 16. The slot 74 is formed within the exterior surface of the spacer. The slot 74 contains a base portion 76, two-spaced apart side portions 78 disposed on opposite sides of the base portion 76, and an end portion 80. The portion of the slot 74 opposite the end portion is open and formed within the outer edge of the spacer 16. The first end of the finger 66 is engaged to the base portion 76 of the slot 74 in a cantilevered fashion and a space 68 is formed between the finger 66 and the base portion 76 of the slot 74. The finger 66 is spaced apart from the base portion 76, wherein the space 68 is disposed between the inner surface of the finger 66 and the base portion 76, as shown in FIG. 14.

The finger 66 extends from the end portion 80 of the slot 74, containing an inner surface, an outer surface, two spaced-apart side portions, and a top end portion. The two spaced-apart side portion and top end portion do not contact any surface of the slot 74 when the finger 66 is in the relaxed state, meaning the finger 66 is not contacting any other surface or surface of a device. The top end portion of the finger 66 is spaced-apart from the outer edge of the spacer 16, creating a distance between the top end portion of the finger 66 and the outer edge of the spacer 66. A protrusion 82 is disposed on the outer surface of the finger 66 and extends radially outwardly. The protrusion 82 extends outwardly from the outer surface of the finger 66 and extends beyond the outer diameter of the spacer 16. As illustrated in FIG. 14, the protrusion 82 may have a triangular cross-section. The finger 66 is resiliently flexible meaning the finger 66 may pivot or bend along the intersection with the end portion 80 of the slot 74 when pressure or force is applied to the finger 66. The finger 66 may pivot or bend inwardly until the inner surface of the finger 66 contacts the base portion 76 of the slot 74 when pressure or force is applied. Once the pressure or force is no longer applied to the finger 66, the finger 66 pivots or bends substantially back to its original position in the relaxed state prior to the pressure or force being applied, resulting in the inner surface of the finger 66 not contacting the base portion 76 of the slot 74 with a space 68 between the inner surface of the finger 66 and the base portion 76 of the slot 74. Alternatively, the finger 66 may pivot or bend radially outwardly from the slot 74 when pressure or force is applied. Once the pressure or force is no longer applied to the finger 66, the finger 66 pivots or bends substantially back to its original position in the relaxed state prior to the pressure or force being applied.

Figure 5:
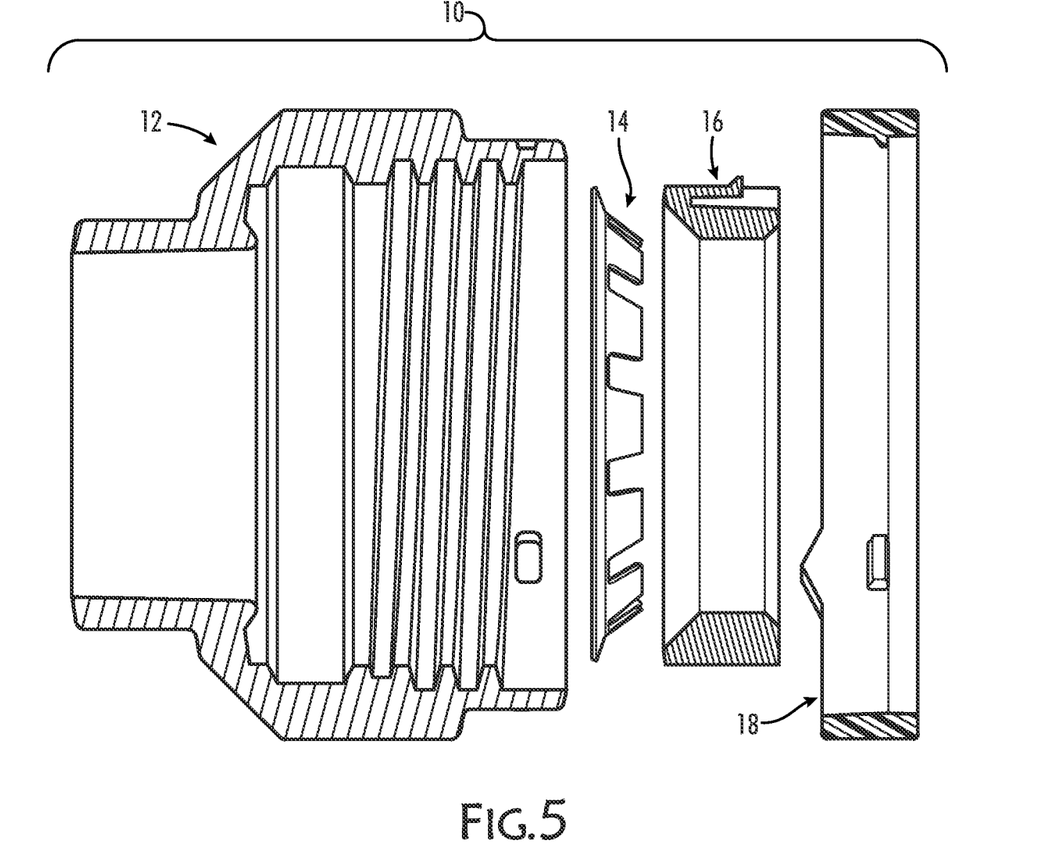
FIG. 5 is an exploded cut-away view of the end nut assembly.
Figure 6:
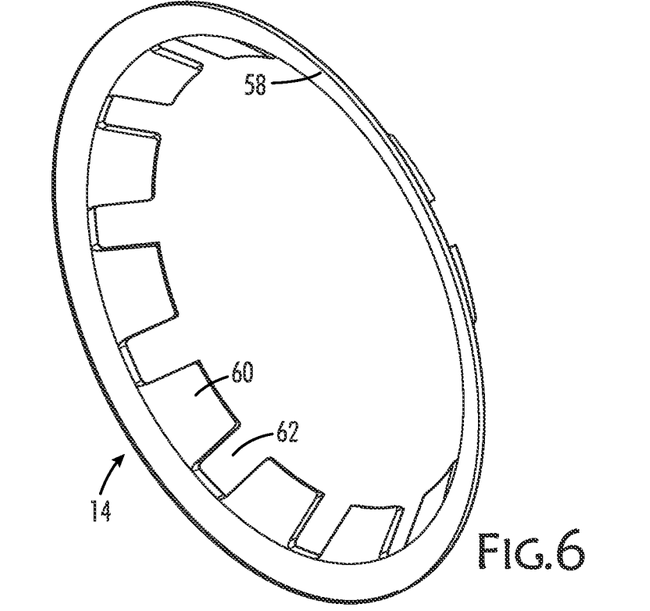
FIG. 6 is a front perspective view of the bite ring.
Figure 7:
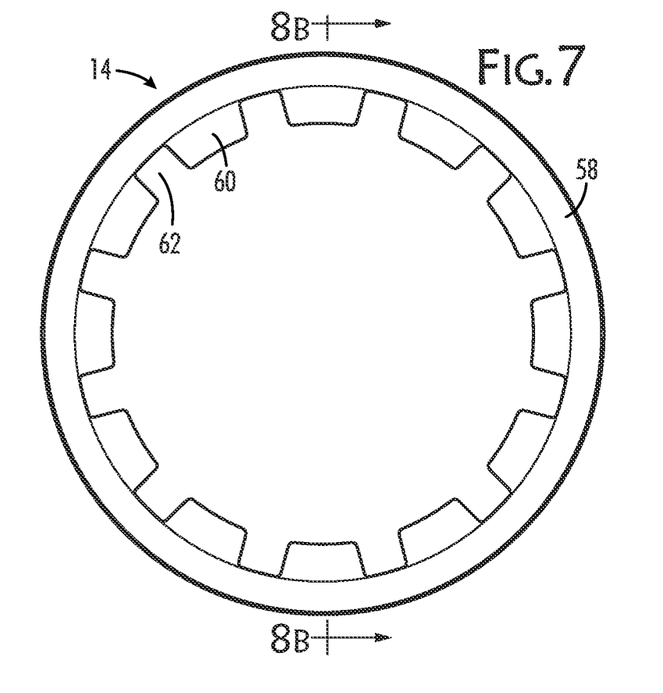
FIG. 7 is a back perspective view of the bite ring.
Figure 8A:
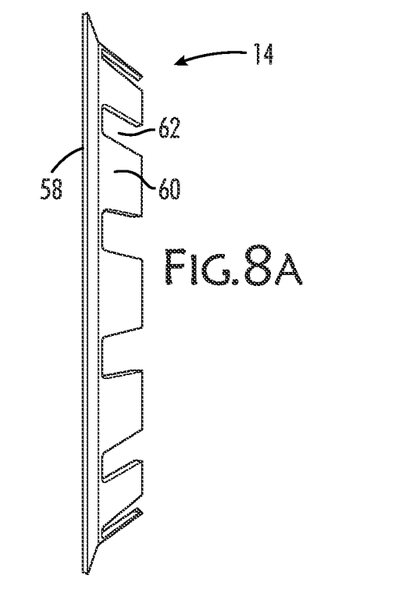
FIG. 8A is a side view of the bite ring.
Figure 8B:
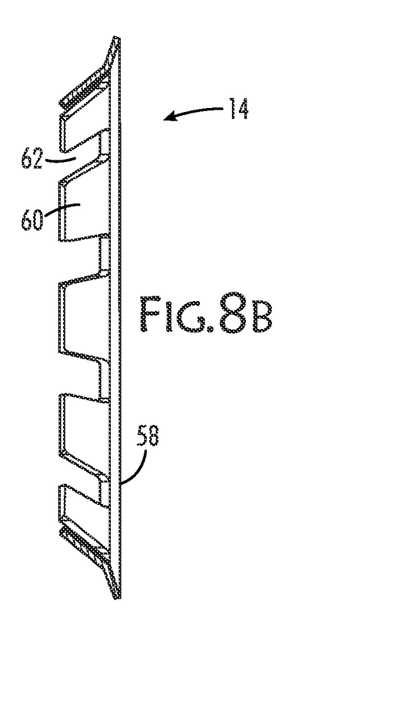
FIG. 8B is another side view of the bite ring.
Figure 17:
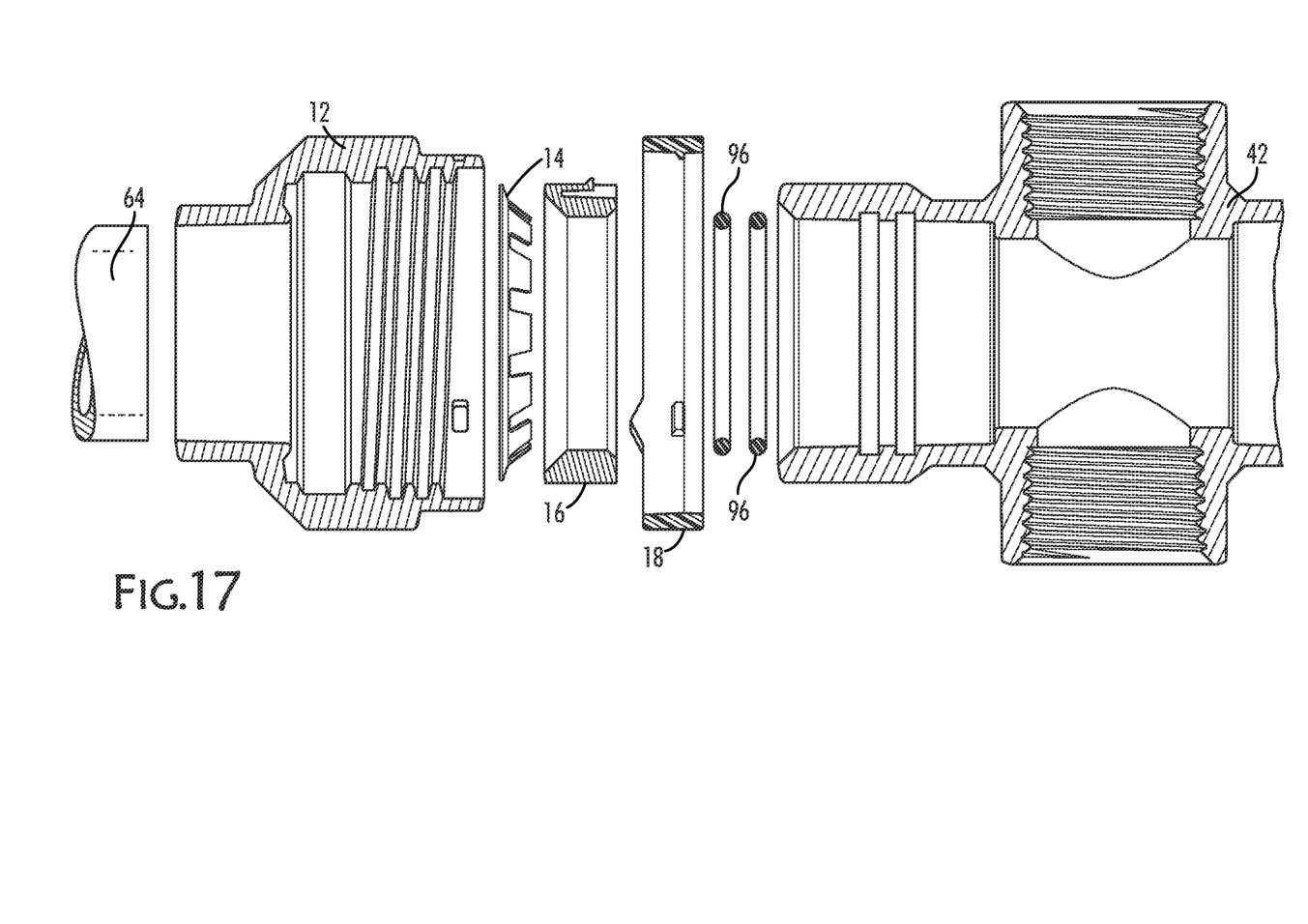
FIG. 17 is a cut-away view of an end nut assembly and ported coupling.

The transition between the inner edge of the spacer 16 and the inner surface is also tapered and contains a tapered section 84, as shown in FIGS. 12 and 14. The width of the tapered section 84 is greater than the width of the tapered section 70. As shown in FIGS. 5, 17, and 18, the exterior surface of the outer ring 58 of the bite ring 14 contacts the tapered section 84 when positioned within the axial bore 20 of the nut body 12. The teeth 60 may also contact the tapered section 84 and are received within the cavity 72. The spacer 16 is positioned within the axial bore 20 such that the protrusion 82 of the finger 66 is received within the second portion opening 34 within the receiving surface 54. The receiving surface 54 contains at least the same number of second portion openings 34 that correspond with the number of fingers 66 on the spacer 16 that is received within the axial bore 20 of the nut body 12. As illustrated in FIG. 13, the spacer 16 may contain three fingers 66 and three corresponding slots 74. However, the spacer 16 may contain one finger 66, two or more fingers 66, or a plurality of fingers 66. Likewise, the spacer 16 may contain one slot 74, two or more slots 74, or a plurality of slots 74.

Figure 9:
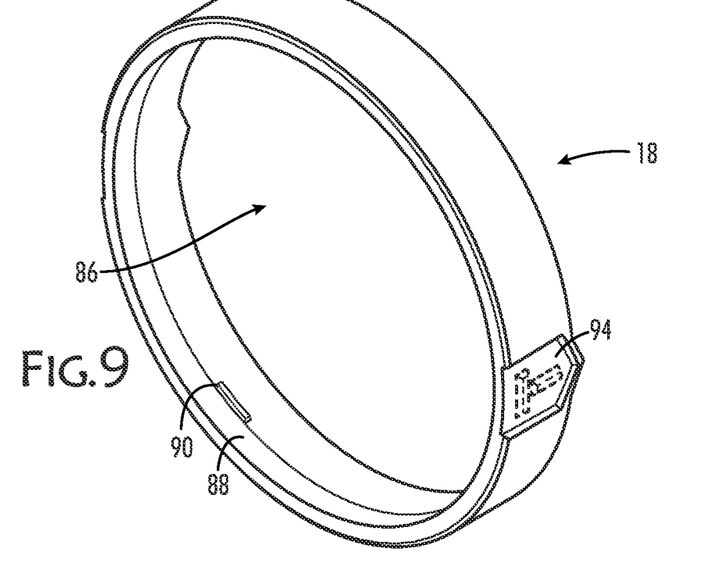
FIG. 9 is a perspective view of the identification ring.
Figure 10:
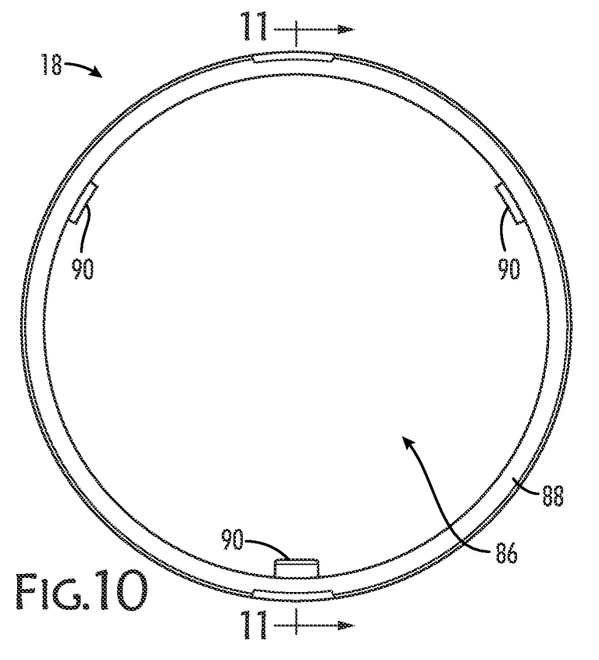
FIG. 10 is a side view of the identification ring.
Figure 11:
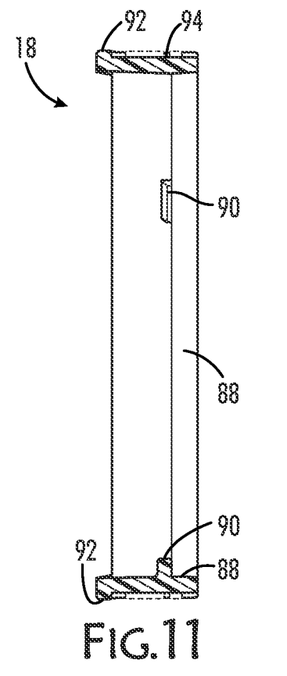
FIG. 11 is a cut-away view of the identification ring.
Figure 15:
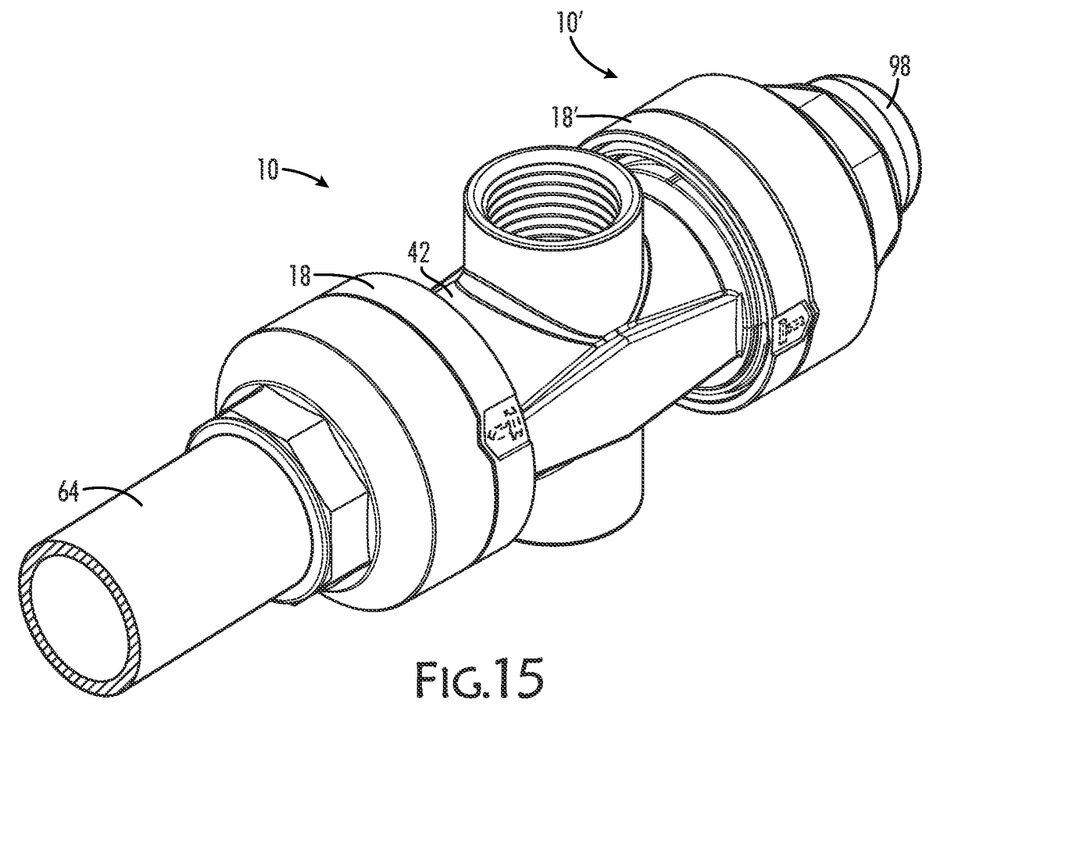
FIG. 15 is a perspective view of end nut assemblies engaged to a ported coupling.

An identification ring 18 is illustrated in FIGS. 9, 10, and 11. The identification ring 18 is optional. The identification ring 18 has a circular cross-section with an inner surface, an outer surface, a first end, and a second end. A cavity 86 is formed within the inner surface and extends between the first end and the second end. The transition between the first end and the inner surface is tapered and contains a tapered section 88. At least one rib 90 extends radially inwardly from the inner surface of the identification ring 18. As illustrated in FIG. 10, three ribs 90 are disposed on the inner surface of the identification ring 18. Preferably, each rib 90 is spaced an equal distance apart from each other along the inner surface. The rib 90 is positioned on the inner surface adjacent the tapered section 88. The rib 90 is received within the channel 56 on the receiving surface 54. The outer surface of the identification ring 18 contains a lip 92 extending outwardly adjacent to the second end. The lip 92 extends continually around the outer surface of the identification ring 18, except for an optional indicia marking portion 94 than may be disposed on the outer surface of the identification ring 18. The indicia marking portion 94 is disposed within the outer surface of the identification ring 18 for receiving indicia markings, such as a logo, symbol, or words, that can identify the product or manufacturer. The indicia marking portion 94 is recessed within the outer surface of the identification ring 18. As illustrated in FIG. 9, the second end of the identification ring 18 contains an extended portion, which is a portion of the identification ring 18 that extends outwardly from the second end. As illustrated in FIG. 9, the indicia marking portion 94 is in the shape of a shield, but any other shape may be accommodated. The identification ring 18 may contain one or more indicia marking portions 94, two or more indicia marking portions 94, or a plurality of indicia marking portions 94. As shown in FIG. 15, the extended portion is received within the indent 52 on the exterior surface of the nut body 12.

Figure 16:
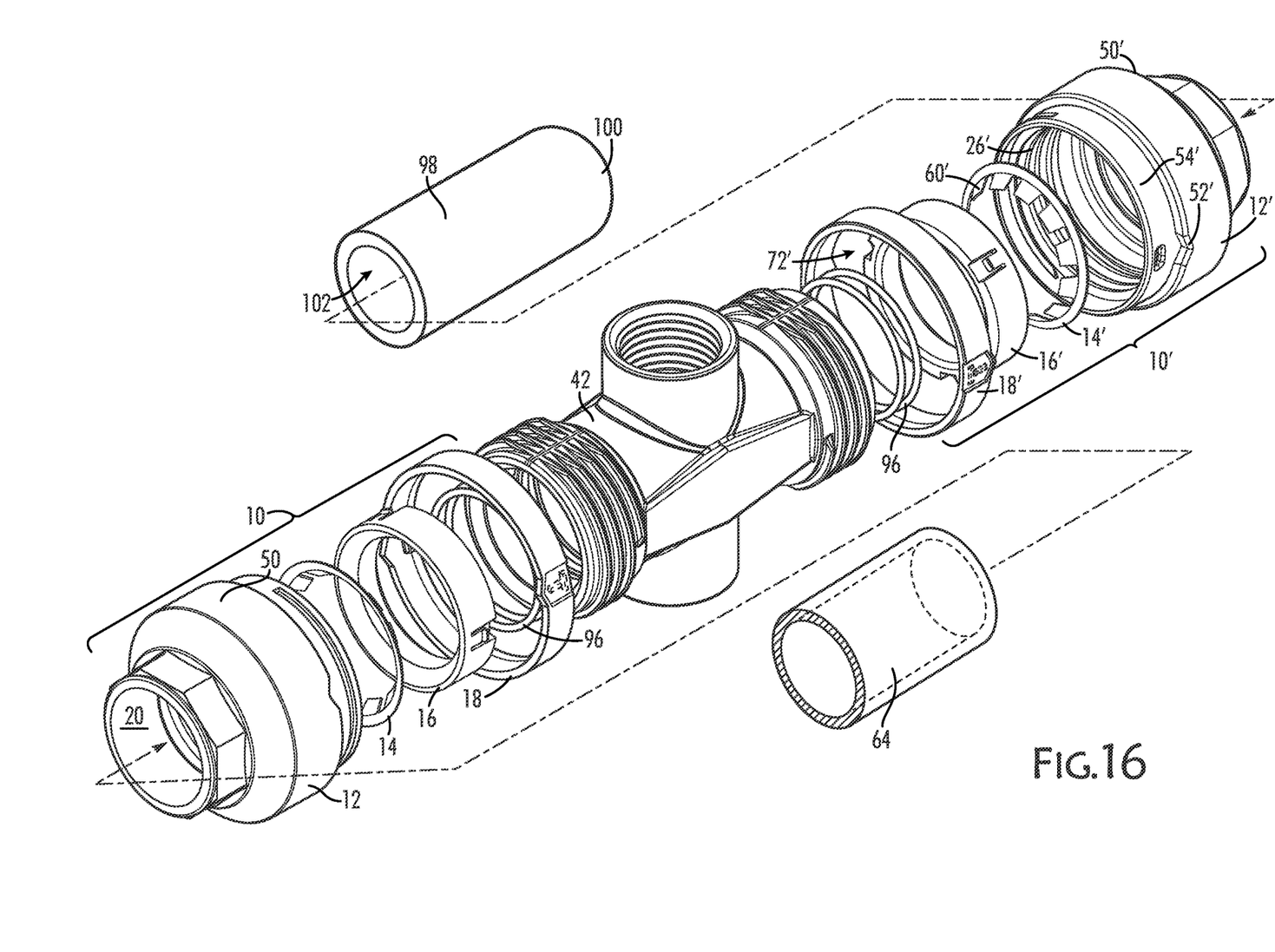
FIG. 16 is an exploded view of end nut assemblies and a ported coupling.

As illustrated in FIGS. 15-18, the end nut assembly 10 may be attached to a coupling, such as a ported coupling 42 or other device. The ported coupling 42 contains external threads corresponding to the internal threads 26 within the nut body 12. As shown in FIGS. 15, 16, and 18, a first end nut assembly 10 is engaged to one end of the ported coupling 42 and a second end nut assembly 10' is engaged to another end of the ported coupling 42.

The bite ring 14 and the spacer 16 are carried in the nut body 12. The bite ring 14 and the spacer 16 are positionable in the axial bore 20. The identification ring 18 is adjacent the receiving surface 54 of the nut body 12, surrounding the receiving surface 54 and adjacent the second shelf 50. The extended portion of the identification ring 18 is positioned within the indent 52, wherein the extended portion has a geometric configuration that corresponds with the geometric configuration of the indent 52, allowing the extended portion to be received within and positioned within the indent 52. The internal threads 26 of the nut body 12 threadedly connect to exterior threads of the ported coupling 42. The nut body 12 may be threaded onto and unthreaded from the ported coupling 42. A pipe segment 64 may be inserted through the first opening 22 of the nut body 12 and into the axial bore 20. The pipe segment 64 progresses through the axial bore 20 where the pipe segment 64 passes through the cavity 72 in the spacer 16 and cavity 86 in the bite ring 14 and into an opening of the ported coupling 42. When the pipe segment 64 is inserted through the cavity 86 of the bite ring 14, the teeth 60 of the bite ring 14 engage the outer surface of the pipe segment 64 for retaining the pipe segment 64 within the nut body 12 of the end nut assembly 10. The tapered section 70 of the spacer 16 may also restrict radially outward movement of the teeth 60 from the outer ring 58, assisting with retaining the pipe segment 64 within the nut body 12 of the end nut assembly 10 without the need of o-rings. The teeth 60 when engaged to the outer surface of the pipe segment 64 can restrict translation of the pipe segment 64 relative to the axial bore 20. The inner surface of the spacer 16 contacts the exterior surface of the teeth 60 when a pipe segment 64 is inserted through the cavity 72 of the spacer 16 and the cavity of the bite ring 14, as illustrated in FIG. 18, preventing the pipe segment 64 from moving radially outward and creating an axial force that assist with engaging the teeth 60 to the outer surface of the pipe segment 64. O-rings 96, as pictured in FIGS. 16-18, may be used in the ported coupling 42, but are not used or contained by the end nut assembly 10. When the pipe segment 64 is inserted, the o-rings 96 deform and engage the outer surface of the pipe segment 64, creating a fluid tight seal between the internal surface of the ported coupling 42 and the pipe segment 64.

As illustrated in FIGS. 15, 16 and 18, a second end nut assembly 10' may be engaged to an opposed side of the ported coupling 42. The bite ring 14' and the spacer 16' are carried in the nut body 12'. The bite ring 14' and the spacer 16' are positionable in the axial bore 20'. The identification ring 18' is adjacent the receiving surface 54' of the nut body 12', surrounding the receiving surface 54' and adjacent the second shelf 50'. The extended portion of the identification ring 18' is positioned within the indent 52', wherein the extended portion has a geometric configuration that corresponds with the geometric configuration of the indent 52', allowing the extended portion to be received within and positioned within the indent 52'. The internal threads 26' of the nut body 12' threadedly connect to exterior threads of the ported coupling 42. The nut body 12' may be threaded onto and unthreaded from the ported coupling 42.

A plug cap 98 may be inserted into an end nut assembly 10 instead of a pipe segment 64. As illustrated in FIGS. 15, 16 and 18, a plug cap 98 is inserted into the second end nut assembly 10' to close the opening and prevent fluid, such as air, from flowing out of the opening when a pipe segment 64 is not inserted. The plug cap 98 is generally circular with a forward end and a rearward end. The forward end may contain a domed cap 100, while the rearward end contains an opening to a cavity 102. The plug cap 98 is hollow and contains a cavity 102 defined by the inner surfaces of the plug cap 98. The forward end is "closed," while the rearward end is "open" and contains the opening and provides access to the central, hollow cavity 102 of the plug cap 98. The forward end may have a chamfered portion on the domed cap 100. The external surface of the plug cap 98 is smooth without any protrusions. Likewise, the internal surface of the plug cap 98 is smooth without any protrusions.

As illustrated in FIGS. 16 and 18, the rearward end of the plug cap 98 is inserted through the first opening 22' of the nut body 12' and into the axial bore 20'. The plug cap 98 progresses through the axial bore 20' where the plug cap 98 passes through the cavity 72' in the spacer 16' and cavity in the bite ring 14' and into an opening of the ported coupling 42'. When the plug cap 98 is inserted through the cavity of the bite ring 14', the teeth 60' of the bite ring 14' engage the outer surface of the plug cap 98 for retaining the plug cap 98 within the nut body 12' of the end nut assembly 10'. The tapered section 70' of the spacer 16' may also restrict radially outward movement of the teeth 60' from the outer ring 58', assisting with retaining the plug cap 98 within the nut body 12' of the end nut assembly 10' without the need of o-rings. The teeth 60 when engaged to the outer surface of the plug cap 98 can restrict translation of the plug cap 98 relative to the axial bore 20'. The inner surface of the spacer 16' contacts the exterior surface of the teeth 60' when a plug cap 98 is inserted through the cavity 72' of the spacer 16' and the cavity of the bite ring 14', as illustrated in FIG. 18, preventing the plug cap 98 from moving radially outward and creating an axial force that assists with engaging the teeth 60' to the outer surface of the plug cap 98. O-rings 96, as pictured in FIG. 18, may be used in the ported coupling 42, but are not used or contained by the end nut assembly 10, and utilized to retain the plug cap 98 within the ported coupling 42. When the plug cap 98 is inserted, the o-rings 96 deform and engage the outer surface of the plug cap 98, creating a fluid tight seal between the internal surface of the ported coupling 42 and the plug cap 98.

The nut body 12 is preferably composed of a metal, such as aluminum, but may be composed of any other material as desired by a user. The bite ring 14 and spacer 16 may by formed of a plastic, polymer material, or other suitable material as desired by the user.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention and are intended to be covered by the following claims.

What is claimed is:

1. An end nut assembly, comprising:
a nut body defining a first portion and a second portion, a first opening is adjacent the first portion and a second opening is adjacent the second portion, an axial bore extends between the first opening and the second opening, wherein the nut body comprises internal threads that are structured to receive external threads of a coupling;
a bite ring defining an outer ring and a plurality of teeth extending radially inwardly from the outer ring; and
a spacer defining an inner surface, containing two tapered sections on opposed sides of the inner surface, and an outer surface, wherein the inner surface defines a cavity centrally located within the spacer, wherein a bottom surface of the spacer is structured to exclusively contact an upper surface of the coupling, wherein the upper surface of the coupling defines a rigid surface and the spacer is positioned within the axial bore and contains a circular cross-section and at least one finger disposed on the outer surface for engaging the nut body.

2. The end nut assembly according to claim 1, wherein the nut body is composed of aluminum.

3. The end nut assembly according to claim 1, further comprising internal threads adjacent the second opening.

4. The end nut assembly according to claim 1, further comprising a shoulder disposed within the axial bore and an internal groove disposed within the axial bore and adjacent the shoulder.

5. The end nut assembly according to claim 1, further comprising an identification ring containing an indicia marking portion, wherein the identification ring comprises a lip extending continually around an outer surface of the identification ring, wherein the indicia marking portion comprises a protrusion that extends from the lip, wherein the protrusion of the indicia marking portion engages with an indent of the nut body.

6. The end nut assembly according to claim 1, wherein the teeth of the bite ring contain two side portions extending radially inwardly from an inner surface of the bite ring and a void is positioned between each tooth along the inner surface of the bite ring.

7. The end nut assembly according to claim 1, wherein the spacer contains two or more resiliently, flexible fingers disposed on the outer surface for engaging the nut body.

8. The end nut assembly according to claim 1, further comprising a plurality of wrench flats disposed about an outer periphery of the nut body.

9. The end nut assembly according to claim 1, wherein the bite ring is positioned between the nut body and the spacer, wherein the bite ring is in contact with each of the nut body and the spacer.

10. A coupling assembly comprising:
an end nut assembly, wherein the end nut assembly comprises:
a nut body defining a first portion and a second portion, a first opening is adjacent the first portion and a second opening is adjacent the second portion, an axial bore extends between the first opening and the second opening;
a bite ring defining an outer ring and a plurality of teeth extending radially inwardly from the outer ring; and
a spacer defining an inner surface and an outer surface, wherein the inner surface defines a cavity centrally located within the spacer wherein the spacer is positioned within the axial bore and contains two or more resiliently, flexible fingers disposed on the outer surface for engaging the nut body,
wherein the spacer defines a receiving surface positioned at an opening of the cavity, wherein the outer ring of the bite ring engages with the receiving surface, and
wherein the bite ring is positioned between the nut body and the spacer, wherein the bite ring is in contact with each of the nut body and the spacer; and
a coupling, wherein the coupling comprises external threads corresponding to internal threads of the end nut assembly and an upper surface defining a rigid surface, wherein a bottom surface of the spacer exclusively contacts the upper surface of the coupling upon attachment of the end nut assembly to the coupling.

11. The coupling assembly according to claim 10, wherein the coupling defines an internal cavity, wherein the coupling comprises at least one o-ring defined completely within the internal cavity, wherein the bite ring and the at least one o-ring are structured to engage a pipe inserted into the coupling assembly.

12. A method of connecting an end nut assembly to a pipe segment comprising:
providing an end nut assembly comprising:
a nut body defining a first portion and a second portion, a first opening is adjacent the first portion and a second opening is adjacent the second portion, an axial bore extends between the first opening and the second opening and internal threads are disposed adjacent the second opening;
a bite ring defining an outer ring and a plurality of teeth extending radially inwardly from the outer ring; and
a spacer defining an inner surface and an outer surface, wherein the inner surface defines a cavity centrally located within the spacer;
engaging the second portion of the nut body to a coupling, wherein a bottom surface of the spacer exclusively contacts an upper surface of the coupling upon engagement of the nut body to the coupling, wherein the upper surface of the coupling defines a rigid surface and the spacer is positioned within the axial bore and contains a circular cross-section and at least one finger is disposed on the outer surface for engaging the nut body; and
inserting a pipe segment into the first opening of the nut body and into the axial bore until an end of the pipe segment is within an opening in the coupling.

13. The method of connecting an end nut assembly to a pipe segment according to claim 12, the nut body is composed of aluminum.

14. The method of connecting an end nut assembly to a pipe segment according to claim 12, further comprising an identification ring with at least one rib disposed on an inner surface and received within a channel disposed on an exterior surface of the nut body.

* * * * *